United States Patent [19]

Hogan et al.

[11] 3,711,106

[45] Jan. 16, 1973

[54] CENTERING DEVICE FOR A CHUCK

[75] Inventors: Patrick J. Hogan; Philip Bolash, both of Philadelphia, Pa. 19132

[73] Assignee: The Budd Co. Philadelphia, Pa.

[22] Filed: Sept. 3, 1971

[21] Appl. No.: 177,747

[52] U.S. Cl. .................................. 279/123, 279/1 L
[51] Int. Cl. .............................................. B23b 31/16
[58] Field of Search ..... 279/1 L, 17, 16, 18, 110, 123

[56] References Cited

UNITED STATES PATENTS 2,496,545   2/1950   Kraemer ............................. 82/45 X
2,485,866   10/1949  Cronlund ............................ 279/16 X Primary Examiner—Gil Weidenfeld
Attorney—Thomas L. Davenport et al.

[57] ABSTRACT

A centering device for proper centering of a workpiece before being gripped by the chuck jaws or grippers.

4 Claims, 4 Drawing Figures

PATENTED JAN 16 1973
3,711,106
SHEET 1 OF 2
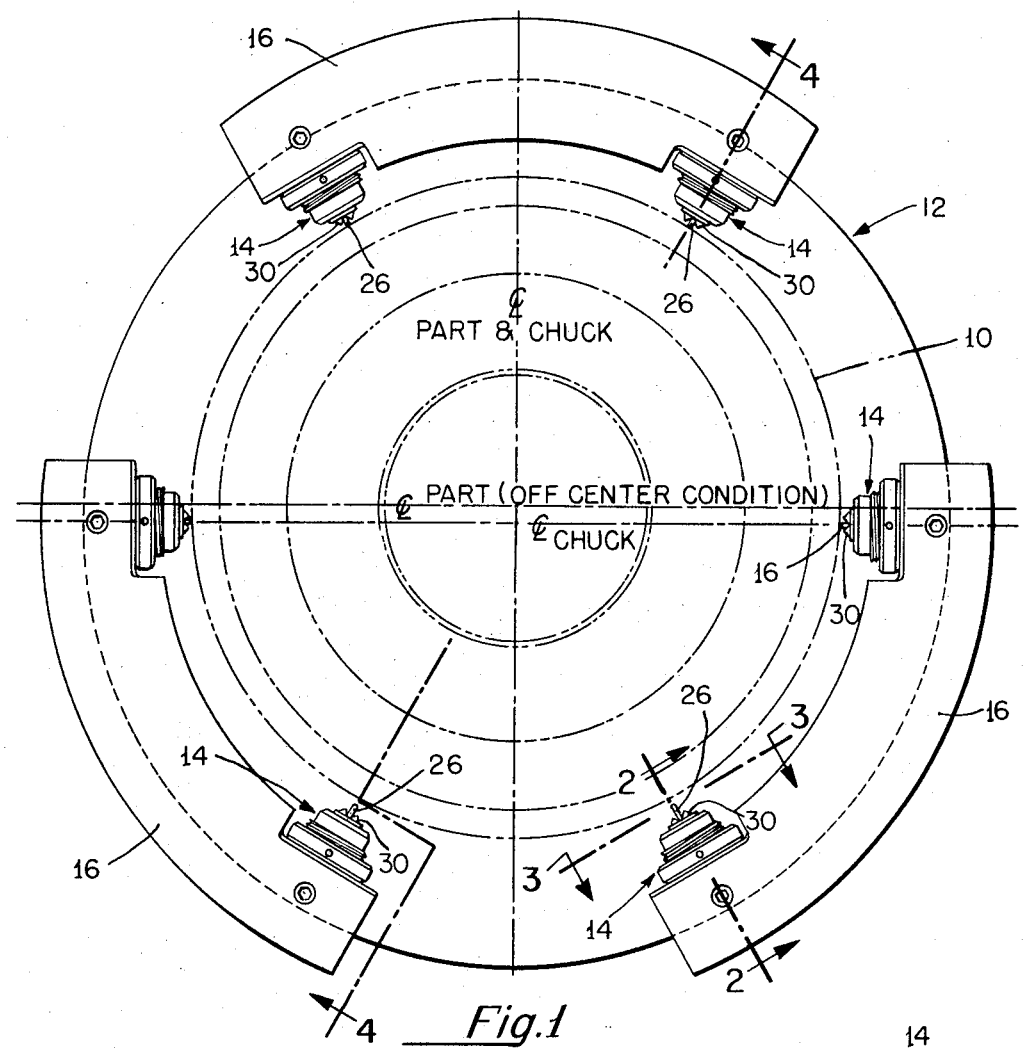
Fig.1
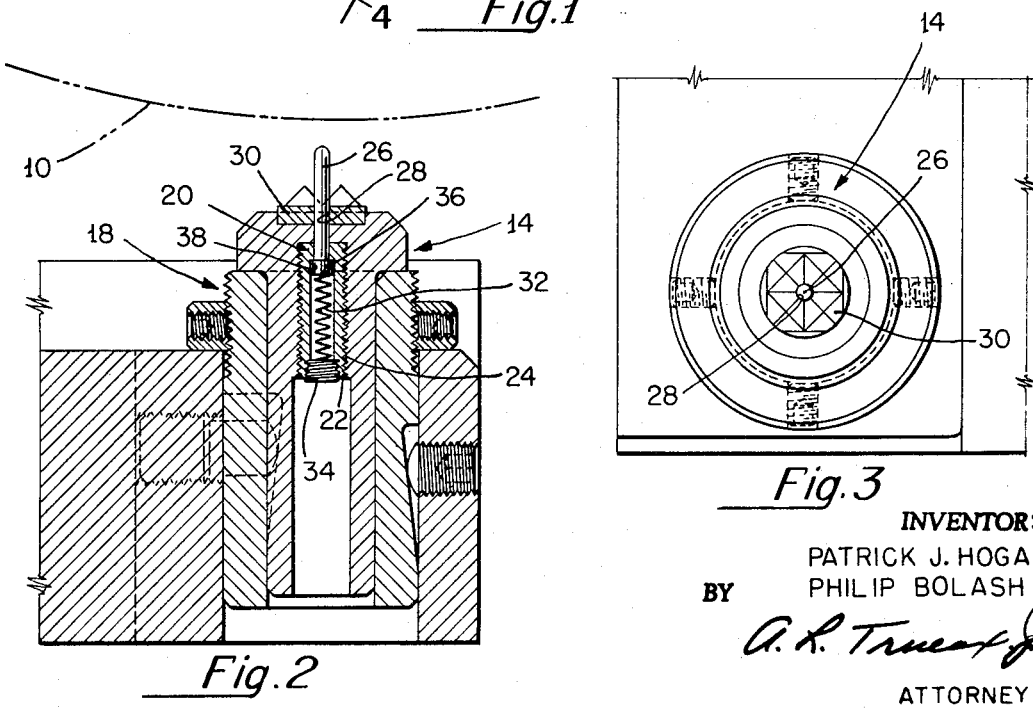
Fig.2
Fig.3
INVENTORS
PATRICK J. HOGAN
PHILIP BOLASH
BY
*A. L. Trueax Jr.*
ATTORNEY

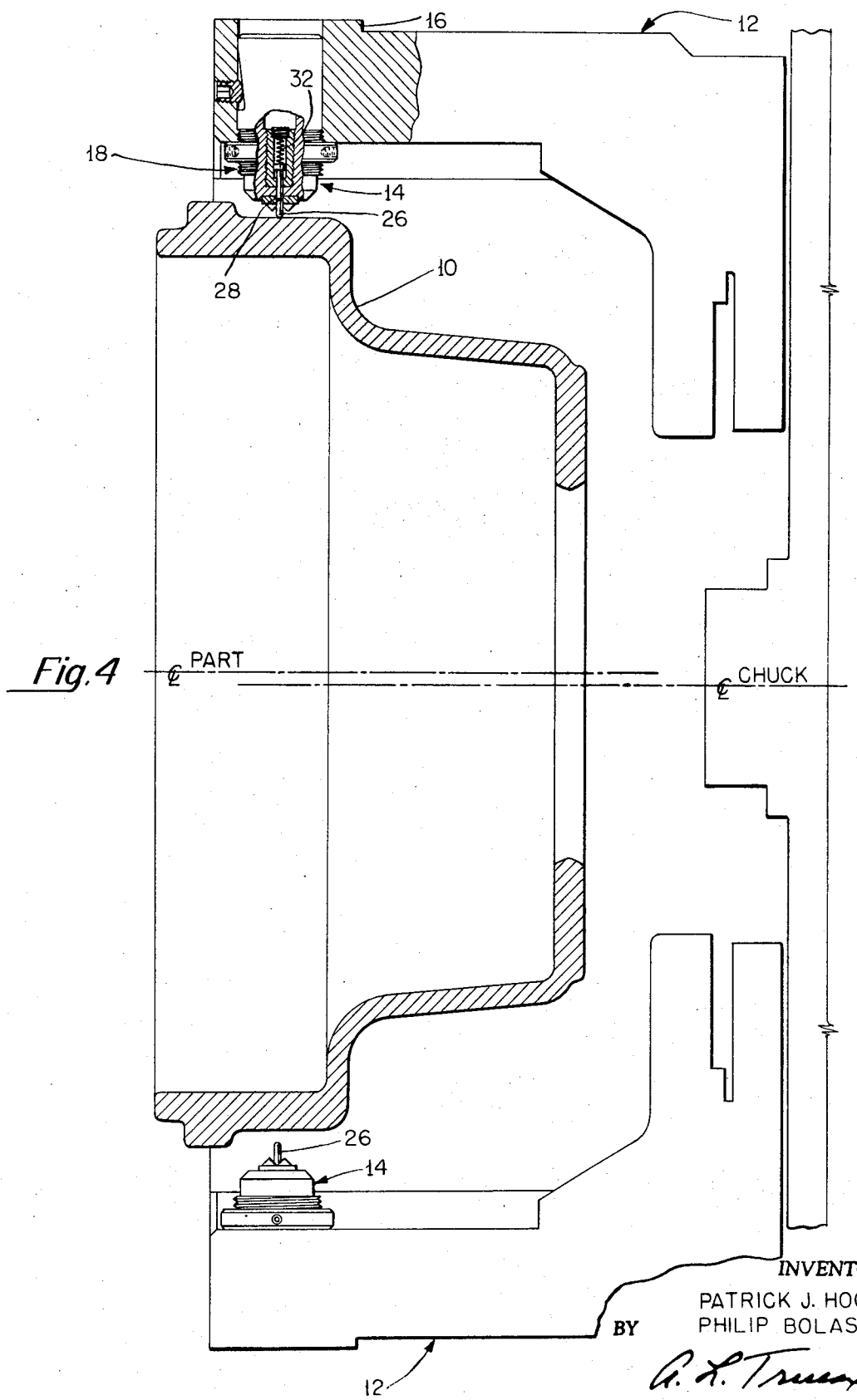

CENTERING DEVICE FOR A CHUCK

This invention relates to a new and improved gripper assembly for chuck jaws and more particularly to a spring biased centering means supported in the gripper assembly.

On high rate production lines where a circular workpiece is moved into and clamped between the jaws of a chuck at high speeds, there is a good possibility the center of rotation of the workpiece will not coincide with the center of rotation of the workpiece holding mechanism.

It is an object of this invention to provide a chuck with an integral centering mechanism for properly centering circular workpieces prior to being gripped and held by the jaws of the chuck.

Another object of this invention is to provide a centering means in each jaw of the workpiece holding chuck for applying a centering force to the workpiece prior to engagement of the chuck with the workpiece.

A further object of this invention is to provide a centering means that can easily be replaced, thereby providing a range of centering pressures that may be used to center a workpiece.

These and other objects of this invention will become apparent as reference is made to the following specification and drawings wherein:

FIG. 1 is a top plan view of a rotary head showing a workpiece in phantom lines positioned off center in the chuck prior to being clamped therein;

FIG. 2 is a view in the direction of the arrows, substantially along line 2:2 of FIG. 1, showing a cross-sectional view of a gripper jaw with a centering device of this invention mounted therein;

FIG. 3 is a view in the direction of the arrows, substantially along line 3:3 of FIG. 1, illustrating the face of the gripper jaw with the centering device;

FIG. 4 is a view in the direction of the arrows, substantially along line 4:4 of FIG. 1, showing the workpiece engaging one of the centering devices prior to the closing of the chuck jaws on the workpiece.

Referring now to the drawings, as best seen in FIG. 1, a workpiece 10 is positioned within a power operated chuck 12 for being secured by a plurality of gripper jaws 14. The chuck 12 includes three slidable master chuck jaws 16 adapted in a conventional manner for movement substantially radially relative to the axis of rotation of the chuck 12.

As seen in FIG. 1, each master chuck jaw 16 supports two gripper jaws 14 for engaging the workpiece 10. As often occurs in a high speed production facility, the center line of the part or workpiece 10 is not properly positioned relative to the center line of the chuck 12. The novel centering devices 18, as best seen in FIG. 2, centers the workpiece 10 relative to the chuck 16 prior to engagement of the gripper jaws 14 with the workpiece.

Each centering device 18 is mounted within a gripper jaw 14 and includes a hollow tubular body portion 20 having a threaded outer surface 22 for threadably cooperating with matching internal threads 24 of the gripper jaw 14 for securing the centering device therein. A spring biased plunger 26 having a contact point on the outer end for contacting the workpiece is positioned for reciprocating motion in the body portion 20 through an aperture 28 in the serated carbide gripper insert 30 of the gripper jaw 14. One end of spring 32 bears against the one end of the plunger 26 within the body portion 18 and provides a predetermined biasing force on the centering plunger 26, the other end of spring 32 is adjustably supported by adjustment screw 34, threadably supported in the body portion 18. Cooperating shoulders 36, 38 of the plunger 26 and body portion, respectively, restrict movement of the plunger away from the spring 30 and determine the extended position of the plunger 26.

The biasing force of the spring 32 may be altered by adjustment of screw 34 or replacement of the spring to provide the required predetermined force to be exerted by the plunger.

In operation, as seen in FIG. 1 and 4, if the workpiece 10 is placed in the chuck with the center line misaligned with the center line of the chuck, the workpiece depresses the plungers 26 on one side and does not contact the plungers 26 on the other side. As the master chuck jaws 16 are moved toward the workpiece 10, the biasing force of the springs 32 acting through the plungers 26 align the center line of the workpiece with the center line of the chuck prior to the carbide gripper inserts 30 contacting the workpiece. When the workpiece is properly centered, continuous movement of the chuck will compress all of the plungers and the gripper inserts will engage the workpiece and hold it in proper position for machining. In the prior art, four of the six gripper inserts could contact the workpiece in an off center position and hold the workpiece in that position during machining, thus, producing a piece of scrap rather than a finished product. The yieldable plungers keep the workpiece spaced from the side grippers that could prevent centering.

Thus it can be seen that the plungers of this invention serve a dual purpose of applying a centering force on the workpiece and keeping the workpiece spaced from the grippers until the workpiece is centered.

While but one embodiment of this invention has been illustrated and described, it is to be understood that there may be various embodiments and modifications within the scope of the following claims.

We claim

1. In a rotary head, a power chuck for centering, gripping and holding a workpiece during a machining operation, said power chuck having a plurality of radially movable master chuck jaws, each of said master chuck jaws including a pair of gripper jaws, each of said gripper jaws having a gripper insert for engaging and securing said workpiece, and a centering means for yieldably engaging and centering said workpiece prior to engagement of said gripper insert therewith.

2. The power chuck as claimed in claim 1 wherein said gripper jaws further include a central aperture in said gripper insert and a reciprocating plunger of said centering means extending therethrough for engaging the workpiece prior to said gripper insert and maintaining a predetermined pressure on said workpiece prior to engagement of said gripper insert.

3. The power chuck as claimed in claim 1 wherein said centering means includes a tubular body having external threads formed thereon, an internal shoulder on one end and internal threads formed in the other end, a reciprocating plunger mounted in the extending from said tubular body having a contact point on one end and a shoulder on the other end for cooperating with said internal shoulder for limiting movement of said plunger in one direction, an adjustment screw threadably engaging said internal threads, and a biasing spring position within said tubular body having one end engaging the shoulder end of said plunger for biasing said plunger shoulder toward said internal shoulder and the other end of said spring engaging said adjustment screw whereby the biasing force of said spring may be adjusted by movement of said screw.

4. Comprising in combination in a master chuck jaw on a power chuck, a workpiece centering and gripping means including a gripper jaw secured in the master chuck jaw for gripping a workpiece, said gripper jaw having a generally pipe-like body, a serated carbide gripper having a central aperture mounted on one end of said body, and internal threads formed in said body; a workpiece centering means including a tubular body portion, a centering plunger and a biasing spring; said body portion having a threaded outer surface for threadably engaging and being supported in said internal threads of said gripper body, an internal shoulder on the one end adjacent said carbide gripper, and an internal threaded portion at the other end; said rod shaped centering plunger extending from within said tubular body portion through said gripper aperture having a contact point on one end for engaging said workpiece, and an external shoulder on the other end for engagement with said internal shoulder for limiting movement of said plunger in one direction; a biasing spring positioned within said tubular body portion having one end contacting said shoulder end of said centering plunger for biasing said plunger against said tubular body portion; and an adjustment screw threadably engaging said tubular body portion internal threads and adjustably supporting the other end of said spring.

* * * * *